United States Patent [19]

Santeler et al.

[11] Patent Number: 5,440,751
[45] Date of Patent: Aug. 8, 1995

[54] BURST DATA TRANSFER TO SINGLE CYCLE DATA TRANSFER CONVERSION AND STROBE SIGNAL CONVERSION

[75] Inventors: Paul Santeler, Cypress; Gary W. Thome, Houston, both of Tex.

[73] Assignee: Compaq Computer Corp., Houston, Tex.

[21] Appl. No.: 718,805

[22] Filed: Jun. 21, 1991

[51] Int. Cl.⁶ ............................................... G06F 5/06
[52] U.S. Cl. .................................. 395/800; 395/500; 364/239.1; 364/DIG. 1
[58] Field of Search ............... 395/800, 425, 575, 325, 395/500; 364/239.1, DIG. 1

[56] References Cited

U.S. PATENT DOCUMENTS

| | | | |
|---|---|---|---|
| 4,920,540 | 4/1990 | Baty | 371/61 |
| 5,083,260 | 1/1992 | Tsuchiya | 395/325 |
| 5,101,492 | 3/1992 | Schultz et al. | 395/575 |
| 5,134,699 | 7/1992 | Aria et al. | 395/425 |
| 5,146,582 | 9/1992 | Begun | 395/500 |
| 5,179,663 | 1/1993 | Iimura | 395/250 |

*Primary Examiner*—Alyssa H. Bowler
*Assistant Examiner*—John Harrity
*Attorney, Agent, or Firm*—Pravel, Hewitt, Kimball & Krieger

[57] ABSTRACT

An apparatus which converts burst mode bus cycles into single cycle mode cycles and converts separate address and data strobe signals into a single address strobe in a computer system. The apparatus also receives an address strobe signal, a number of address signals and the length of the burst when a device begins a burst cycle. After the first cycle of the burst transfer is complete, the apparatus initiates each subsequent cycle comprising the burst transfer by incrementing the address signals and providing additional address strobe signals until the burst is complete. The logic also facilitates address pipelining by monitoring a next address signal generated by the device. The apparatus monitors the separate address strobe and data strobe signals and generates the single address strobe signal on the next clock cycle after the address and data strobe signals are asserted. If only the address strobe signal is asserted at the beginning of a cycle, then the single address strobe signal is asserted only after valid data is available on the bus and the data strobe signal is asserted. The apparatus also monitors next address signals generated by the device to facilitate pipelining.

4 Claims, 9 Drawing Sheets

BURST DATA TRANSFER TO SINGLE CYCLE DATA TRANSFER CONVERSION AND STROBE SIGNAL CONVERSION

SPECIFICATION

Background of the Invention

1. Field of the Invention

The present invention relates to data transfer methods in computer systems, and more particularly to a method for converting a burst mode transfer into a single cycle mode transfer and for converting separate address and data strobe signals into a single strobe signal.

2. Description of the Related Art

Computer systems continue to increase in size and complexity. One example of modern personal computer systems are those based on the Extended Industry Standard Architecture (EISA). EISA is a superset of the Industry Standard Architecture (ISA) which was introduced in the International Business Machines (IBM) PC/AT personal computer. Most EISA computer systems include a host or memory bus and a separate input-/output or EISA bus. EISA computer systems utilize a standard chip set which includes, among others, a chip referred to as the EISA bus controller (EBC) such as the 82358 from Intel Corporation (Intel) or its equivalent. The EBC is situated between the host bus and the EISA bus and interfaces between the two buses. One limitation in current implementations of the EBC is that the EBC does not recognize burst transfers on the host bus. In addition, the EBC does not include an input for a data strobe signal. The EBC includes two address strobe signal inputs referred to as HADS* and FADS* (referred to as the HADS0*, and HADS1* signals by Intel) which essentially perform the same function. Because the EBC does not include a data strobe signal input, address and data signals must both be valid on the host bus when the EBC receives an address strobe signal at its HADS, and FADS, inputs.

Problems may arise when the EBC is included in a system which includes a device on the host bus that generates cycles utilizing both an address strobe signal and a data strobe signal and the two are not necessarily synchronized to each other. An example of such a device is the C5 or 82495 cache controller produced by Intel. As an example of the problems that may occur, the C5 cache controller may initiate a cycle by asserting the address strobe signal and placing a valid address on the bus, and several clock cycles may elapse before the C5 asserts the data strobe signal and provides valid data on the bus. However, when the EBC sees the address strobe signal asserted during a write cycle, it assumes that both a valid address and valid data are on the bus, and thus the EBC may receive erroneous data. Therefore, a method and apparatus is desired which allows the EBC to operate properly in conjunction with devices such as the C5 cache controller which utilize independent address strobe and data strobe signals.

Burst transfers involve a data transfer wherein the requesting device initiating the transfer indicates the type and size of the transfer, and the device responding to the request decodes this information to determine the number of transfers and to return the proper amount of data. In this manner, certain control signals are only needed at the beginning and end of the transfer, thus increasing the speed of the transfer. Further, burst operations are typically performed at a high rate, such as one per master clock cycle. An alternative to burst transfer mode is a data transfer mode referred to as single cycle mode. In single cycle mode, each individual data transfer is initiated with an address strobe signal (ADS) and terminates with a ready signal (RDY), upon which the next single cycle transfer may begin. A disadvantage of single cycle mode is that conventionally at best two master clock cycles are required per transfer. One problem with current implementations of the EBC is that the EBC does not support host bus burst transfers, but rather expects a new address strobe signal with each data request. Incompatibility problems arise when the EBC is operated with devices which initiate burst transfers. One solution to this problem was to use the HRDY output of the EBC to generate a RDY sigal to the bursting device to terminate each cycle. The bursting device would be required to generate a new ADS signal to continue operation, and thus single cycle mode was emulated in this manner. However, if the requesting device expects all transfers to be burst transfers and does not accept a RDY input, i.e., will not accept a short termination of a burst transfer, then this method will not work and incompatibility problems will result. An example of a device which executes only burst transfers and does not accept a ready input is the previously mentioned C5 cache controller produced by Intel. Therefore, an apparatus is desired which allows devices that do not recognize burst transfers to operate properly with devices that only perform burst transfers.

SUMMARY OF THE INVENTION

A system according to the present invention comprises an apparatus which converts burst mode bus cycles into single cycle mode cycles. The computer system in the preferred embodiment includes a C5 cache controller which, as discussed above, does not accept a ready input to short cycle burst transfers and therefore expects all transfers to be full length burst transfers. When the cache controller asserts its address strobe, it indicates the type and size of the transfer and the device responding to the request must decode these signals to determine the number of transfers and transfer the proper amount of data with the corresponding ready signals. Logic according to the present invention receives address bits 2 and 3 and the transfer size indicating signals when a host bus burst cycle begins. If the cycle requires the operation of the EBC, the logic according to the present invention operates to emulate single mode cycles to allow the EBC to operate properly. Once the EBC asserts its ready signal indicating that the first cycle is complete, the logic increments host address bits 2 and 3 to the next address and asserts a new address strobe to the EBC. The logic continues to initiate each subsequent cycle comprising the burst transfer until the last cycle is completed. The logic also facilitates address pipelining by monitoring the next address signal HNA, generated by the EBC.

A system according to the present invention further includes logic coupled between the C5 cache controller and the host bus which monitors the address strobe and data strobe signals CADS* and CDTS*, respectively, produced by the C5 cache controller and generates a single strobe signal referred to as the HADS, which is supplied to the HADS, input of the EBC. The logic also generates a single strobe signal to the memory controller referred to as MADS*. The logic asserts the HADS, signal on the next clock cycle after the CADS* and CDTS* signals are asserted. If only the CADS* signal is asserted at the beginning of a cycle, then the memory address strobe signal MADS* is asserted to the memory controller, but the HADS* signal is asserted to the EBC only after valid data is available on the bus and the CDTS* signal is asserted. In this manner, a valid address and data are guaranteed to be on the bus before the EBC receives the HADS* signal. The logic also monitors the next address signals generated by the memory controller and the EBC to facilitate pipelining.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
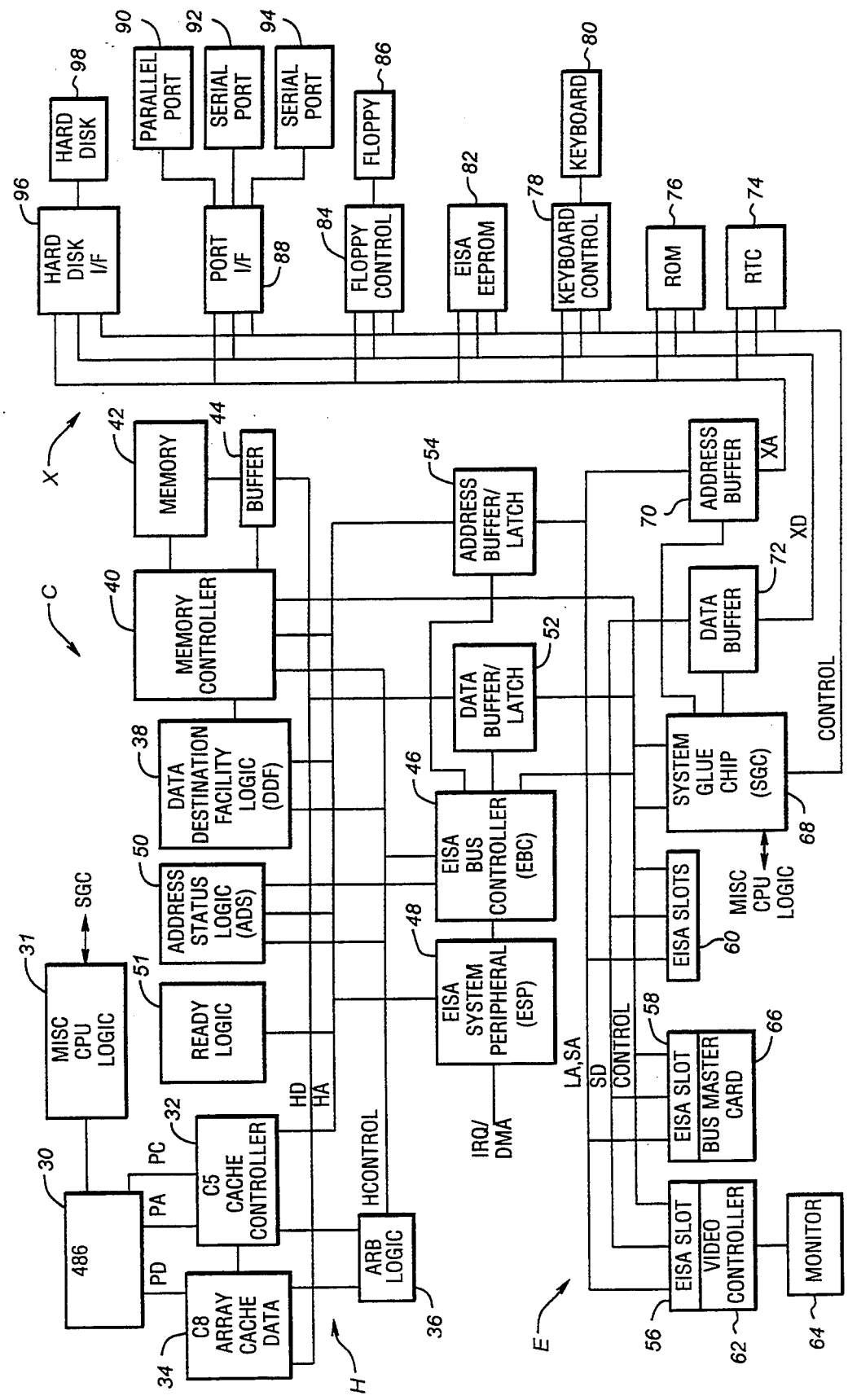
FIG. 1 is a block diagram of a computer system incorporating the present invention.

Referring now to FIG. 1, a computer system generally referred to by the letter C incorporating the present invention is shown. The foundation of a computer system C according to the present invention is a microprocessor 30, preferably the 486 from Intel. Connected to the microprocessor 30 is a cache subsystem comprising a cache controller 32, preferably the C5 cache controller by Intel, and an array of cache data RAM's 34, preferably the C8 data RAM's also from Intel. The microprocessor 30, the cache controller 32 and the cache data RAM's 34 are connected as indicated and specified by Intel. To this end the processor data bus PD is connected to the data RAM's 34 and the processor address bus PA and the processor control bus signals PC are connected to the cache controller 32. The cache controller 32 and the cache data RAM's 34 are also connected by various control signals. Preferably the devices are the 50 MHz versions.

The cache controller 32 and the cache data RAM's 34 are coupled to a bus generally referred to as the host bus H which includes a host data bus HD portion, a host address bus HA portion and a host control bus HCONTROL portion. The HA portion includes address signals HA<31:2> and byte enable signals HBE<3:0>*. Arbiter logic 36 according to the present invention is coupled between the C5 cache controller 32 and the HCONTROL portion and produces some control signals onto the HCONTROL bus from signals provided by the cache controller 32 and the cache data RAM's 34. The HCONTROL bus includes signals such as the memory read or write signal, the memory or input/output signal, various address and data strobes and so on as commonly utilized by the various other elements in the computer system C.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application Ser. No. 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAM's) arranged in an interleaved format. The memory controller 40 includes the necessary functions to control the operation of the DRAM's and of the data buffer 44. Ready logic 51 which generates ready signals to the various devices coupled to the host bus H is coupled to the HCONTROL portion of the host bus H.

In the preferred embodiment, the computer system C utilizes the EISA or Extended Industry Standard Architecture for the external bus. The EISA bus is generally referred to by the letter E in the Figure. The EISA bus E is comprised of several portions, the LA and SA address buses, the SD data bus and the control bus. For further details on the EISA bus and architecture, please refer to the EISA Technical Reference Guide published by Compaq Computer Corporation. A bus controller 46 referred to as the EBC provides certain of the necessary control functions between the host bus H and the EISA bus E. An exemplary EBC is the 82358 from Intel. As previously discussed in the background, the EBC 46 includes two address strobe inputs referred to as HADS* and FADS* and does not include a data strobe input, whereas the C5 cache controller 32 generates both address and data strobe signals. The arbiter logic 36 according to the present invention receives address strobe and data strobe signals CADS* and CDTS*, respectively, from the cache controller 32 and generates a single strobe signal referred to as HADS* which is connected to the HADS* input of the EBC 46 according to the present invention. Connected to the EBC 46 is ADS or address strobe logic 50 according to the present invention. The ADS logic 50 converts burst mode cycle transfers generated by the cache controller 32 into single cycle mode cycles for use by the EBC 46. Also connected to the EBC 46 is the EISA system peripheral (ESP) 48, which includes various timers, the direct memory access (DMA) controller and the interrupt controller logic of the computer system C. An exemplary ESP is the 82357 from Intel.

The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 preferably includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. It is noted that the bus master card 66 could be either an EISA bus master or an ISA bus master. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations; an address buffer 70; and a data buffer 72. The SGC 68 controls the operation of the data buffer 72 and the address buffer 70, as well as providing various strobes over an X control bus to the miscellaneous devices contained on the X bus. The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device (not shown). An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96. This list of peripheral devices is exemplary and numerous other peripheral devices could be developed either on the X bus or on the EISA bus E.

Figure 2:
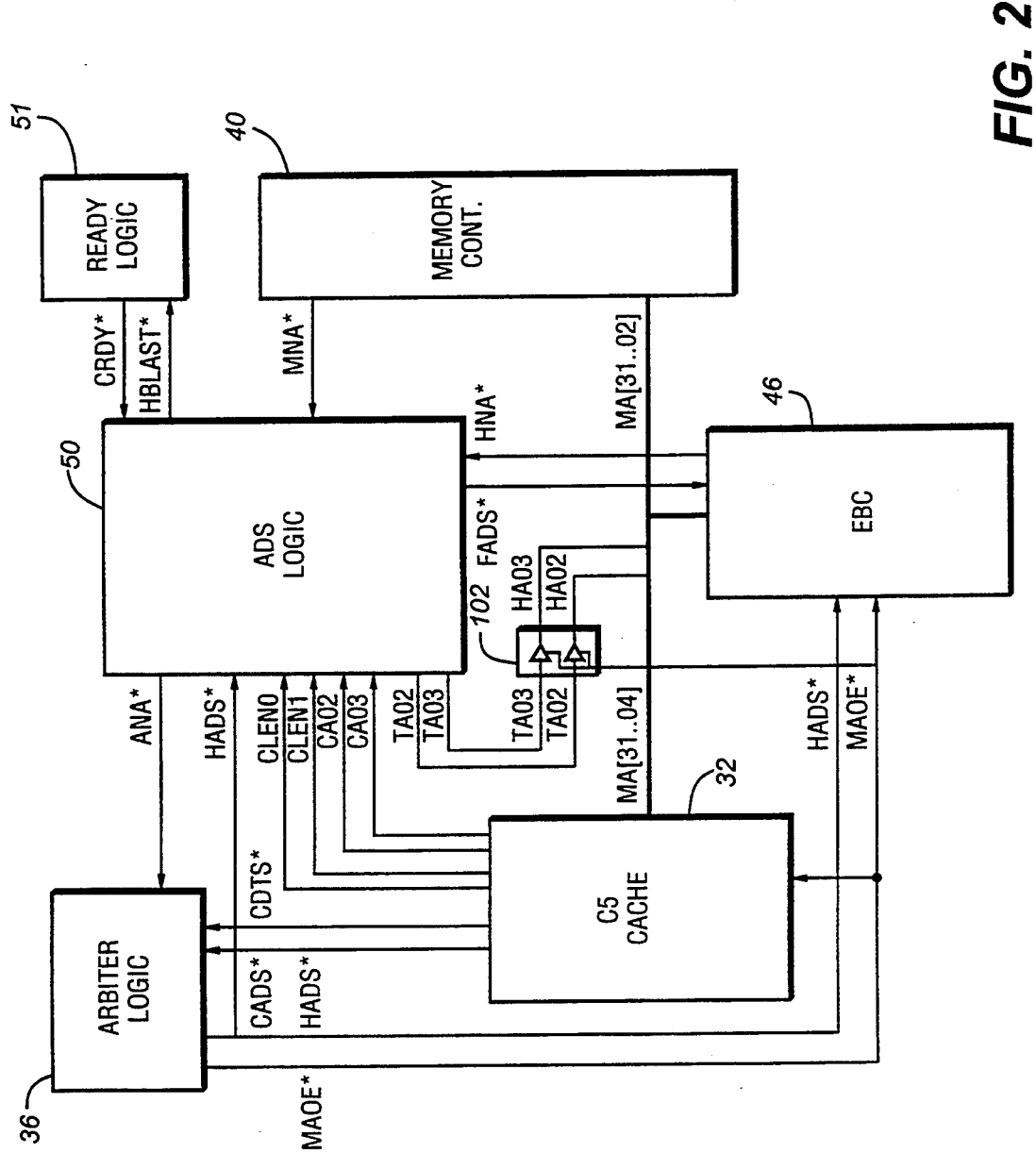
FIG. 2 illustrates the ADS logic of the present invention interfaced to portions of the computer system of FIG. 1.

Referring now to FIG. 2, the ADS logic 50 is shown interfaced to portions of the computer system C. FIG. 2 is not intended to completely illustrate the interconnection between the various elements, but is only intended to aid in understanding the present invention. In the following description, a signal name followed by an asterisk is asserted when the signal has a logic low value and is an inverted version of the signal name without an asterisk. As previous discussed, the arbiter logic 36 receives the CADS, and CDTS* signals from the C5 cache controller 32 and utilizes these signals to generate the address strobe signal HADS, that is provided to the EBC 46 and also to the ADS logic 50. The operation of the arbiter logic 36 in generating the HADS* signal is described more fully below. The arbiter logic 36 also generates a memory address output enable signal referred to as MAOE*, which is provided to the EBC 46 and the C5 cache controller 32. The MAOE* signal is asserted low to allow the cache controller 32 to drive the HA bus. The C5 cache controller 32 generates signals referred to as CLEN0, CLEN1, CA02 and CA03 which are provided to the ADS logic 50. The CLEN0 and CLEN1 signals are generated by the C5 cache controller 32 to indicate the length of a burst transfer cycle which can be either 1, 2 or 4 transfers. The CLEN1 and CLEN0 signals have values 0 and 0, respectively to represent that the bus cycle will only comprise one transfer. The CLEN1 and CLEN0 signals have values 0 and 1, respectively, to indicate that the bus cycle will comprise two transfers. The CLEN1 signal having the value 1 indicates that the bus cycle will comprise four transfers, regardless of the state of the CLEN0 signal. The CA02 and CA03 signals are address bits 2 and 3 generated by the cache controller 32.

The C5 cache controller 32 is coupled to the HA<31..4> address lines. The EBC 46 and the memory controller 40 are coupled to the HA<31:2> address lines. The ADS logic 50 utilizes the CA03 and CA02 signals to generate two address signals referred to as TA03 and TA02 which are provided through transceivers 102 and are coupled to the HA<03> and HA<02> address lines on the host bus, respectively. The transceivers 102 are controlled by the MAOE* signal. The ADS logic 50 generates an address strobe signal referred to as FADS, which is provided to the FADS* input of the EBC 46. The ADS logic 50 receives a next address signal referred to as HNA, from the EBC 46 and utilizes this signal to generate a next address signal referred to as ANA* to the arbiter logic 36. The ADS logic 50 also generates a signal referred to as HBLAST* to the ready logic 51. The HBLAST* signal is a host bus last address signal that is asserted during the last cycle of a multiple cycle transfer for a processor initiated operation. The memory controller 40 generates a next address signal referred to as MNA* to the ADS logic 50. The ready logic 51 generates a ready signal referred to as CRDY* to the ADS logic 50.

When the cache controller 32 executes a host bus cycle which requires a device on the EISA bus, the ADS logic 50 operates as follows. First, the cache controller 32 makes a host bus request by asserting the CADS* signal. The CDTS* signal may be asserted contemporaneously with the CADS* signal or at a later time. The arbiter logic 36 initiates the host bus cycle by generating the HADS* signal to the EBC 46 and the ADS logic 50 after receiving the CDTS* signal. The C5 cache controller 32 supplies host address signals HA<31..4> to the EBC 46. The ADS logic 50 receives address bits 2 and 3, the CA02 and CA03 signals, from the cache controller 32, and supplies the TA02 and TA03 signals onto the host bus H as the HA<03> and HA<02> signals to the EBC 46. Once the EBC 46 asserts the HNA* signal, indicating that it is finished with the current address, the ADS logic 50 increments the address signals TA02 and TA03 to the next address and asserts a new address strobe via the FADS* input to the EBC 46. The ADS logic 50 then proceeds to initiate each subsequent cycle until the last cycle is completed. The ADS logic 50 also includes logic which handles address pipelining by monitoring the MNA* and HNA* signals. In the preferred embodiment, the C5 cache controller 32 only generates a maximum of four cycles in a burst transfer, and thus the ADS logic 50 is designed only to generate up to three consecutive transfers after the first transfer in a burst cycle.

Figure 3:
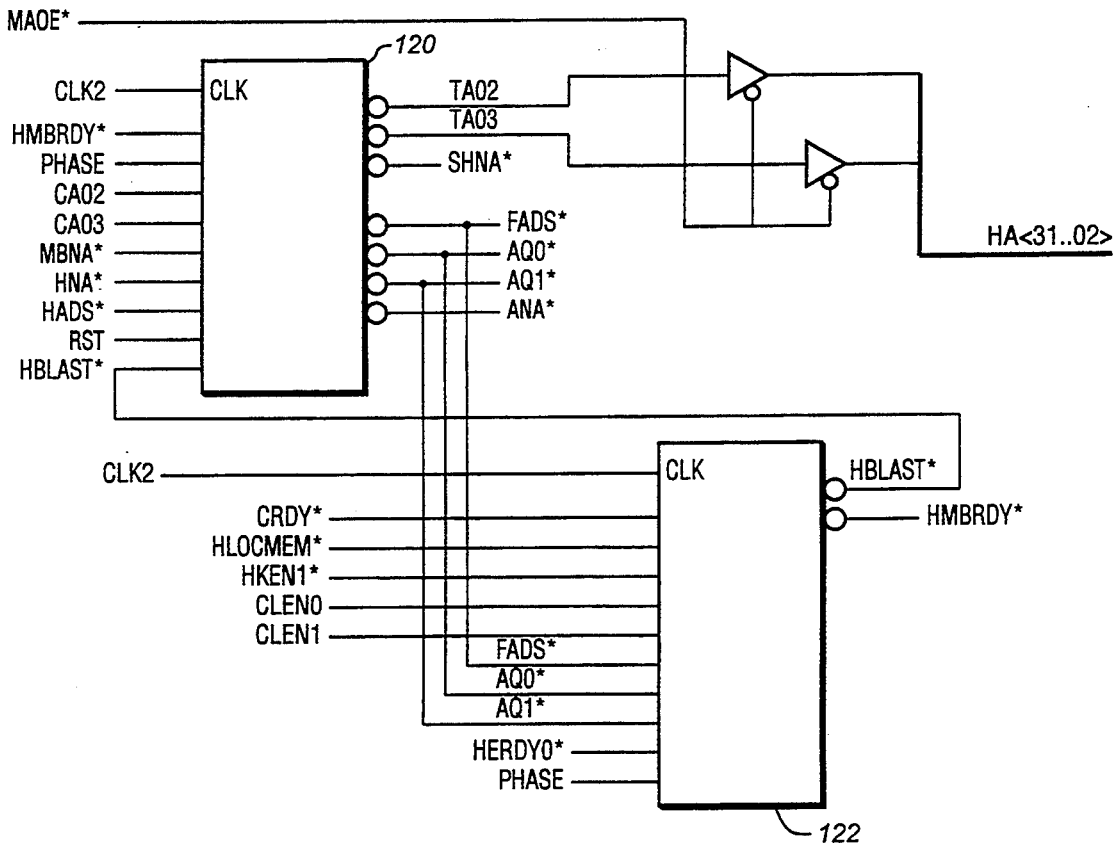
FIG. 3 illustrate programmable array logic (PAL) devices comprising the ADS logic of FIG. 2.

Referring now to FIG. 3, the ADS logic 50 includes two programmable array logic (PAL) devices 120 and 122. A brief discussion of the signal names used in the ADS logic 50 is deemed appropriate. A signal referred to as CLK1 is a system clocking signal operating at 25 MHz. A signal referred to as CLK2 is a system clocking signal operating at 50 MHz. A signal referred to HMBRDY* is a ready signal generated by the host memory controller 40. A signal referred to as PHASE is a clocking signal running at 25 MHz that is used by the PAL's 120 and 122 to predict the state of the CLK1 signal used internally in the EBC 46. A signal referred to as LHLOCMEM* indicates that a memory access is directed to memory located on the host bus. A signal referred to as HKEN* is a cacheable address signal which indicates, when asserted low, that the current address is a cacheable address. A signal referred to as RST indicates, when asserted high, that a power up reset condition is occurring.

Referring now to FIG. 3, the PAL 120 receives the HMBRDY* signal, the PHASE signal, the CA02 signal, the CA03 signal, the MBA* signal, the HNA* signal, the HADS* signal, and the RST signal. The PAL 120 receives the CLK2 signal at its clock input. The PAL 120 generates the TA02, TA03, FADS*, and ANA* signals, as well as signals referred to as SHNA*, AQ0* and AQ1*. The SHNA* signal is a version of the HNA* signal sampled during the middle of the CLK1 signal. The equation for the SHNA* signal is as follows:

SHNA := RST* HNA PHASE

The ANA* signal is a next address signal generated by the ADS logic 50 and provided to the arbiter logic 36 to indicate that a burst cycle to the EISA bus E has completed. The ANA* signal is asserted when the EBC 46 asserts the HNA* signal for the last cycle of a multiple cycle transfer. The equation for the ANA* signal is as follows:

ANA
 := RST* HNA PHASE HBLAST AQ1*

The FADS* signal is an address strobe signal provided from the ADS logic 50 to the FADS* input of the EBC 46. The FADS* signal is asserted by the ADS logic 50 to start all subsequent transfers of a multiple cycle transfer from the cache controller 32 to the EBC 46 after the first transfer. As noted above, the FADS* and HADS* signals can be considered functionally equivalent and for purposes of this description can be assumed to be ANDed internally in the EBC 46 to indicate the effective strobe. The first cycle is always initiated by the arbiter logic 36 asserting the HADS* signal. The equation for the FADS* signal is as follows:

FADS := RST* · SHNA · HBLAST* · PHASE*
  + RST* · FADS · PHASE
  + RST* · FADS · HMBRDY*

The first minterm of the equation asserts the FADS* signal on the rising edge of the CLK1 signal after the HNA* signal is asserted if the current cycle is not the last cycle in the burst transfer. The second minterm of the equation holds the FADS* signal in its current state on the low half of the CLK1 signal cycle. The combination of the first and second minterms assures that the FADS signal is asserted for at least one CLK1 signal cycle. The third minterm holds the FADS* signal in its current state during pipelined mode so that the FADS* signal is not removed until the EBC 46 is ready for the next cycle.

The AQ0* and AQ1* signals represent a state machine referred to as the tracker state machine generated inside the PAL 120 which tracks the subcycles of a cache line read or cache line write burst cycle. The equations for the AQ0* and AQ1* signals are as follows:

AQ0 := RST* · AQ1* · AQ0* · SHNA · PHASE* ·
  HBLAST*
  + RST* · AQ1 · AQ0* · SHNA · PHASE*
  + RST* · AQ0 · SHNA*
AQ1 := RST* · AQ1* · AQ0* · SHNA · PHASE* ·
  HBLAST*
  + RST* · AQ1 · AQ0* · SHNA · PHASE*
  + RST* · AQ0 · SHNA*

The equations for the TA03 and TA02 signals are as follows:

TA03* := RST* · HADS · CA03*
  + RST* · SHNA · AQ1* · AQ0* · TA03*
  + RST* · SHNA · AQ1* · AQ0 · TA03
  + RST* · SHNA · AQ1 · AQ0* · TA03*
  + RST* · TA03* · SHNA* · HADS*
TA02* := RST* · HADS · CA02*
  + RST* · SHNA · PHASE* · AQ1* · AQ0* · TA02
  + RST* · SHNA · PHASE* · AQ1* · AQ0 · TA02
  + RST* · SHNA · PHASE* · AQ1 · AQ0* · TA02
  + RST* · TA02* · SHNA* · HADS*

Figure 4:
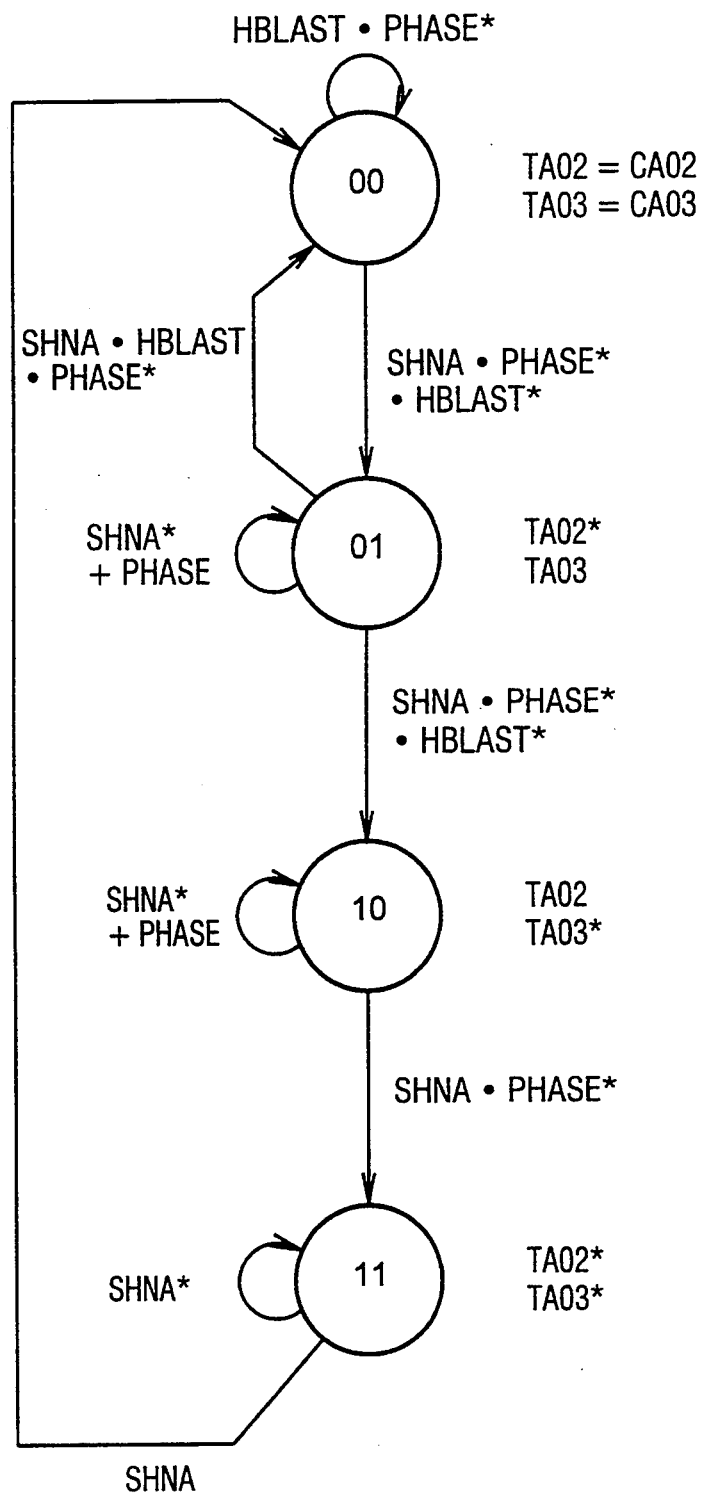
FIG. 4 is a state transition diagram illustrating operation of a state machine generated by the ADS logic of FIG. 3.
Figure 5:
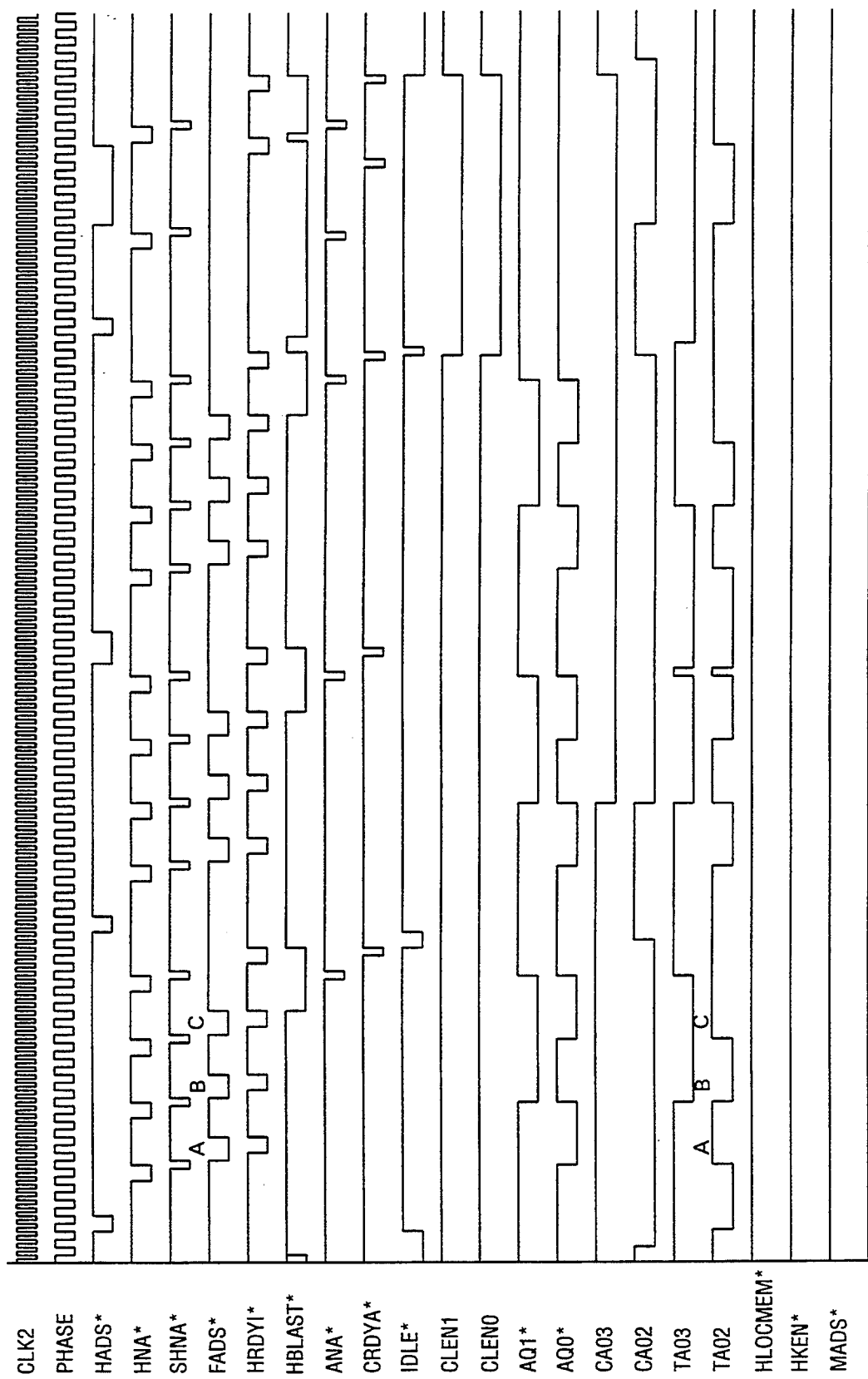
FIG. 5 is a timing diagram illustrating operation of the ADS logic of FIG. 3.

Referring now to FIG. 4, the tracker state machine is shown. Reference is also made to the timing diagram of FIG. 5, which is referenced in the following description. FIG. 5 illustrates three 4 cycle burst transfers followed by 2 single cycle transfers. In the following description, reference is only made to the first 4 cycle burst transfer. Referring again to FIG. 4, each of the states in the state machine are comprised of two bits which correspond to the status of the AQ1 and AQ0 signals. The state machine begins in state 00 at the beginning of a burst cycle and increments on each new address until the end of the cycle. All states lead to state 00 when the RST signal is asserted. In state 00, the TA02 and TA03 signals are set equal to the CA02 and CA03 signals generated by the cache controller 32. The state machine remains in state 00 if the condition:

HBLAST PHASE* is true. Therefore, if a single cycle transfer is initiated by the processor 30, the state machine remains in state 00. The state machine advances from state 00 to state 01 when the condition

SHNA PHASE* HBLAST* is true. If a multiple cycle transfer, i.e., either 2 or 4 cycles, is initiated, the state machine advances to state 01 when the EBC 46 indicates that it is ready for the next address. The first cycle will have been initiated by the arbiter logic 36 as described below. Thus ADS logic 50 recognizes the response from the EBC 46 for this first cycle and then proceeds. The FADS* signal is asserted at the same time as the transition to state 01 and is present for one CLK1 signal cycle or until the EBC 46 is ready, as discussed above. This is shown at point A of FIG. 5. The TA02 signal is flipped at the same time as the entry into state 01 to generate the new address for the next cycle. The TA03 signal remains unchanged. The state machine remains in state 01 while the SHNA, signal is negated and while out of phase with the EBC 46, and thus the state machine is waiting for the EBC 46 to request the next address. The state machine returns from state 01 to state 00 if the second cycle is the last cycle of the transfer, signified by the condition:

SHNA HBLAST PHASE*.

Since FIG. 5 illustrates a 4 cycle burst transfer, this condition is not illustrated in FIG. 5. The state machine advances from state 01 to state 10 if the current cycle is not the last cycle and the EBC 46 requests the next address, signified by the condition:

SHNA PHASE* HBLAST*.

At the same time as the transition to state 10, the FADS* signal is asserted as above, and the TA02 and TA03 signals are both flipped to generate the third address in the burst transfer, as shown at point B of FIG. 5. The state machine remains in state 10 until the next address is requested by the EBC 46, at which time the state machine advances to state 11. At this transition the FADS* signal is again asserted, the TA03 signal remains the same, and the TA02 signal is flipped to generate the fourth and final address in the burst transfer, as shown at point C of FIG. 5. The HBLAST* signal being negated is not a condition for the transition from state 10 to state 11 because 3 cycle burst transfers cannot occur in the preferred embodiment. The C5 cache controller 32 only initiates 4 cycle burst transfers, and the processor 30 only initiates either 1, 2 or 4 cycle transfers. The state machine remains in state 11 while the SHNA* signal is negated. The state machine returns to state 00 when the SHNA* signal is asserted, indicating completion of the fourth and last cycle in the transfer. Therefore, the state machine begins in state 00 at the beginning of a burst cycle and increments on each address bits 2 and 3 on each successive state until the end of the burst cycle.

Referring again to FIG. 3, the PAL 122 receives input signals CRDY*, HLOCMEM*, HKEN1*, CLEN0, CLEN1, FADS*, AQ0*, AQ1*, HERDYO* and PHASE. The HLOCMEM* signal indicates, when asserted low, that a memory device on the host bus is being accessed. The HLOCMEM* signal is negated high when a device on the EISA bus is being accessed. The HERDY0* signal is an early ready signal generated by the EBC 46 to terminate a bus cycle. The PAL generates the HBLAST* and HMBRDY* signals.

The HMBRDY* signal is a version of the HERDYO* signal delayed one CLK1 signal cycle. The equation for the HMBRDY signal is as follows:

HMBRDY
:= HERDYO PHASE* + HMBRDY·
PHASE RST*

As previously mentioned, the HBLAST* signal indicates that the current cycle is the last bus cycle in a burst transfer. For cache line fills and code fetches, the last cycle occurs on the fourth sub-cycle of the burst transfer. For all other CPU cycles, the last cycle occurs on the first or second cycle, depending on the CLEN1 and CLEN0 signals from the C5 cache controller 32. The equation for the HBLAST* is as follows:

HBLAST := AQ1* · AQ0 · FADS · HMBRDY ·
PHASE* · CLEN1* · CLEN0 · HKEN*
+ AQ1 · AQ0 · FADS · HMBRDY · PHASE*
+ HADSD1 · HADS* · CLEN1* · CLEN0* ·
HKEN* · LHLOCMEM*
+ HBLAST · CRDY* · RST*

The first minterm in the equation asserts the HBLAST* signal when the tracker state machine is in state 01, the CLEN1 and CLEN0 signals are 0 and 1, respectively, the cycle is a non-cacheable cycle, and the FADS* and HMBRDY* signals are asserted. Therefore, the HBLAST* signal is asserted in state 01 when the cache controller 32 has indicated that the transfer is only two cycles in length. Because the cache controller 32 only generates 4 cycle burst transfers, a 2 cycle transfer is generated by a non-cacheable EISA read from the processor 30. The second minterm asserts the HBLAST* signal when the tracker state machine is in state 11 and the FADS* and HMBRDY* signals are asserted. This minterm asserts the HBLAST* signal on the fourth cycle of an EISA transfer regardless of whether the cycle is cacheable or non-cacheable. The third minterm asserts the HBLAST* signal on a single write cycle or a non-cacheable data read cycle from the EISA bus. The fourth minterm maintains the HBLAST* signal in its current state while the CRDY* signal is negated.

As previously discussed, the C5 cache controller 32 generates separate address and data strobe signals referred to as CADS* and CDTS*. However, the EBC 46 in the preferred embodiment does not include an input for a data strobe signal, but only receives an address strobe signal. Therefore, the arbiter logic 36 according to the present invention receives the separate address and data strobe signals generated by the C5 cache controller and converts these signals into a single address strobe signal for the EBC 46.

Figure 6:
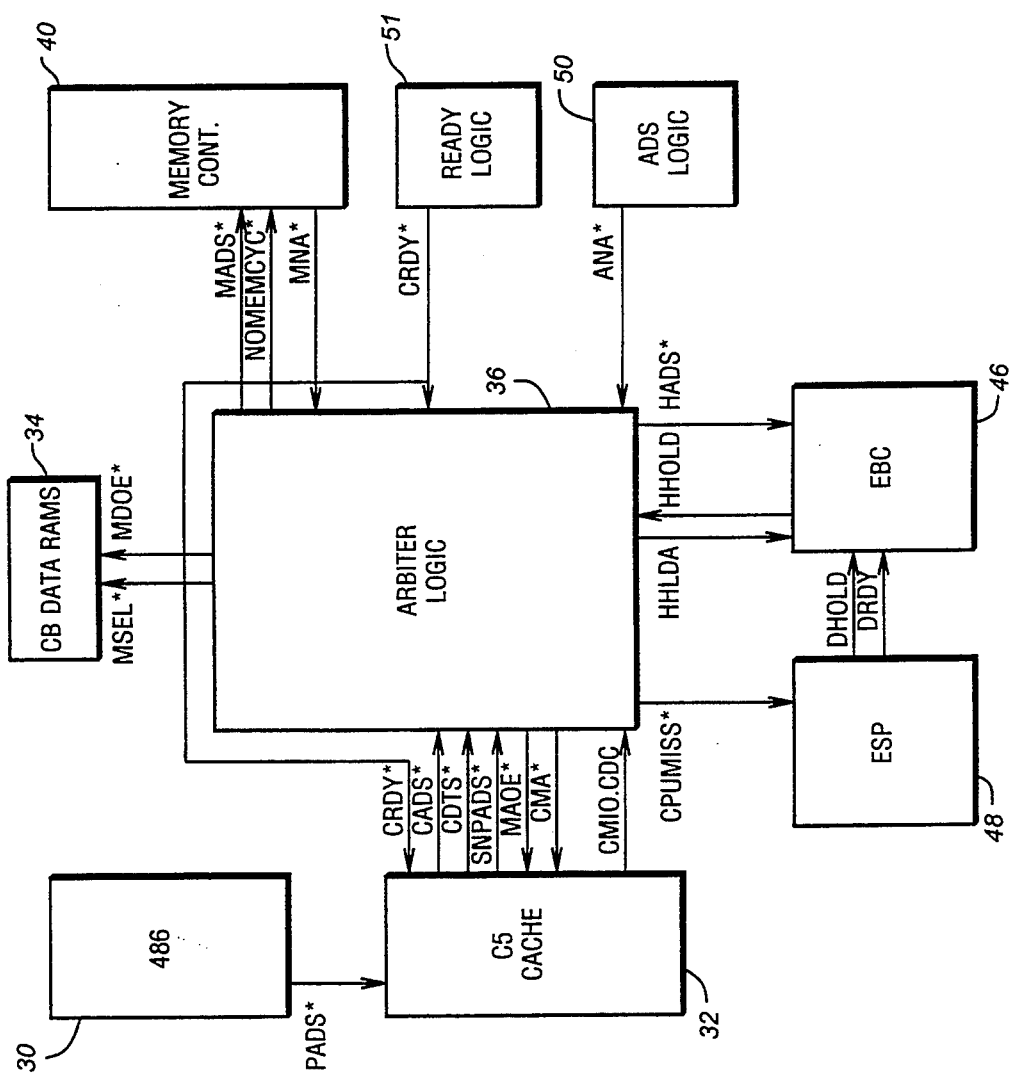
FIG. 6 illustrates the arbiter logic of the present invention interfaced to portions of the computer system of FIG. 1.

Referring now to FIG. 6, the arbitration logic 36 is shown interfaced to various elements in the computer system C. FIG. 6 is not intended to provide a complete diagram of the interconnection between the various elements, but is intended to aid in an understanding of the present invention. The 486 processor 30 generates a processor address strobe signal referred to as PADS* to the C5 cache controller 32 to begin a cycle. The C5 cache controller generates the CADS* signal, the CDTS* signal, and signals referred to as SNPADS*, CMIO and CDC to the arbiter logic 36. The SNPADS* signal is an address strobe signal similar to the CADS* signal that is asserted on write-back cycles when a snoop hit occurs to a modified location. The CMIO signal is a cycle definition signal which indicates whether the memory bus cycle requested is a memory cycle or an (I/O) cycle. The CDC signal is a cycle definition signal which indicates whether the cycle is a data or code cycle. The arbiter logic 36 utilizes the CADS* and CDTS* signals to generate the HADS* signal to the EBC 46 and the MADS* signal to the memory controller 40, as is explained further below. The arbiter logic 36 generates the MAOE* signal. The arbiter logic receives the next address signals MNA* and ANA* from the memory controller 40 and ADS logic 50, respectively, and generates a cache next address signal referred to as CNA* to the C5 cache controller 32. The arbiter logic 36 generates a chip select signal referred to as MSEL* to the C8 cache data RAM's 34. The arbiter logic also generates a memory data output enable signal referred to as MDOE* to the C8 data RAM's 34, which is used to control the data RAM's driving of data onto the host bus H. The arbiter logic 36 generates a signal referred as CPUMISS* to the ESP 48, which indicates that a cache miss has occurred. The ESP 48 provides a DMA hold request signal referred to as DHOLD and a DMA ready signal referred to as DRDY to the EBC 46. The EBC 46 generates the host hold signal HHOLD to the arbiter logic 36, and the arbiter logic in turn provides a host hold acknowledge signal referred to as HHLDA to the EBC 46. The ready logic 51 provides the cache ready signal CRDY* to the arbiter logic 36 and the C5 cache controller 32. The arbiter logic 36 also generates a signal referred to as NOMEMCYC* to the memory controller 40. If the memory controller 40 samples the NOMEMCYC* signal asserted when the MADS* signal is asserted, then the memory controller 40 will not run the cycle.

Figure 7:
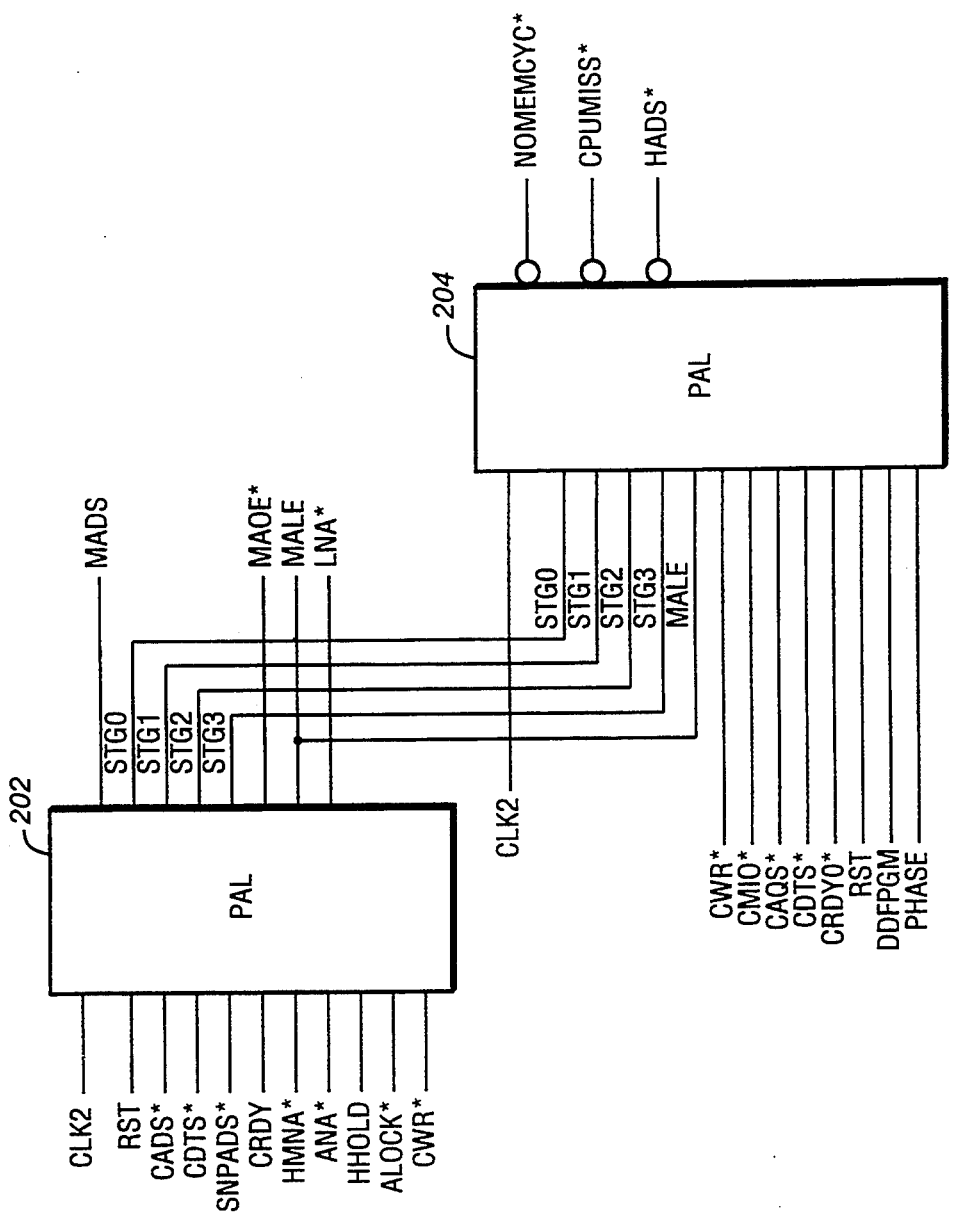
FIG. 7 illustrates PAL devices comprising the arbiter logic of FIG. 6.

Referring now to FIG. 7, the arbiter logic 36 includes two PAL devices 202 and 204. A brief discussion of the signal names used in the arbiter logic 36 is deemed appropriate. A signal referred to as ALOCK* is a locking signal which indicates, when asserted low, that the arbiter logic 36 should retain control of the host bus. A signal referred to as DDFPGM is asserted high when DDF programming is enabled.

The PAL 202 receives input signals RST, CADS*, CDTS*, SNPADS*, CRDY, HMNA*, ANA*, HHOLD, ALOCK*, CWR* and MDOE*. The PAL 202 receives the CLK2 clock signal in its clock input. The PAL 202 generates the memory address strobe signal MADS*, the memory address output enable signal MAOE*, a memory address latch enable signal referred to as MALE, and the cache next address signal CNA*. The PAL 202 also generates signals referred to as STG0, STG1, STG2, and STG3, which represent a state machine generated inside the PAL 202 which facilitates generation of various control signals. The PAL 204 receives the STG0, STG1, STG2, and STG3 signals from the PAL 202, as well as the MALE, CWR*, CMIO*, CAOS*, CDTS*, CRDY*, RST, DDFPGM, and PHASE signals. The PAL 204 generates the NOMEMCYC*, MDOE*, CPUMISS*, and HADS*, signals. The state machine represented by the STG<0..3> signals aids in the translation of the CADS* and CDTS* signals into the HADS* signal, as is explained further below. The equations for the STG0, STG1, STG2, and STG3 signals are as follows:

STG0 := STG0* · STG1* · STG2* · STG3* ·
    MALE* · MAOE · ALOCK* · HHOLD ·
    CRDY*
 + STG0* · STG2* · STG3* · MALE · MAOE ·
    CDTS* · CADS
 + STG0* · STG2* · STG3 · MALE · MAOE* ·
    HHOLD* · CDTS · CADS
 + STG0* · STG2* · STG3 · MALE · MAOE* ·
    SNPADS
 + STG0* · STG1* · STG3 · MALE · MAOE* ·
    SNPADS
 + STG0* · STG1 · STG2* · STG3 · MALE ·
    MAOE* · HHOLD* CDTS*
 + STG0 · STG2* · STG3* · MALE* · MAOE ·
    CDTS*
 + STG0 · STG1* · STG2* · MALE · MAOE* ·
    CRDY*
 + STG0 · STG1* · STG2* · STG3* · MALE ·
    MAOE*
 + STG0 · STG1* · STG2* · STG3 · MALE* ·
    MAOE · CRDY*
 + STG0 · STG1* · STG2 · STG3* · MALE* ·
    MAOE
 + STG0 · STG1* · STG2 · STG3* · MAOE ·
    RST
 + STG0 · STG1 · STG2* · STG3* · MAOE ·
    CDTS*
 + RST

STG1 := RST* · STG0* · STG2* · STG3* · MALE* ·
    MAOE · HHOLD* · CRDY* · ANA
 + RST* · STG0* · STG2* · STG3* · MALE* ·
    MAOE · HHOLD* · CRDY* · MNA
 + RST* · STG0* · STG2* · STG3* · MALE* ·
    MAOE · ALOCK · CRDY* · ANA
 + RST* · STG0* · STG2* · STG3* · MALE* ·
    MAOE · ALOCK · CRDY* · MNA
 + RST* · STG0* · STG2* · STG3 · MALE ·
    MAOE* · SNPADS* · CDTS* · CADS
 + RST* · STG1 · STG2* · STG3* · MALE* ·
    MAOE · CRDY*
 + RST* · STG0* · STG1 · STG3* · MALE* ·
    MAOE
 + RST* · STG0* · STG1 · STG2* · MALE* ·
    MAOE
 + RST* · STG0* · STG1 · STG2* · STG3* ·
    MAOE · CRDY*
 + RST* · STG0* · STG1 · STG2* · STG3 ·
    MALE · MAOE* · SNPADS* · CDTS*
 + RST* · STG0 · STG1* · STG2 · STG3* ·
    MALE* · MAOE · CDTS

STG2 := STG0* · STG1* · STG3* · MALE ·
    MAOE · CDTS · CADS
 + STG0* · STG2* · STG3* · MALE ·
    MAOE · CRDY · CDTS · CADS
 + STG0* · STG2* · STG3 · MALE ·
    MAOE* · SNPADS* · CDTS · CADS
 + STG0* · STG1* · STG2 · STG3* · MALE ·
    MAOE
 + STG1* · STG2 · STG3* · MALE ·
    MAOE · RST
 + STG0* · STG1* · STG2 · STG3 · MALE ·
    MAOE* · SNPADS*
 + STG0* · STG1 · STG3* · MALE* ·
    MAOE · CRDY*
 + STG0* · STG1 · STG2* · STG3 · MALE* ·
    MAOE
 + STG0* · STG1 · STG2* · STG3 · MALE ·
    MAOE* · SNPADS* · CDTS
 + STG0* · STG1 · STG2 · STG3* · MALE* ·
    MAOE · CWR*
 + STG0 · STG1* · STG3* · MALE* · MAOE
 + STG0 · STG2* · STG3* · MALE* ·
    MAOE · CRDY
 + STG0 · STG1 · STG2* · STG3* · MALE ·
    MAOE · CDTS
 + RST

STG3 := RST* · STG0* · STG1* · STG3* · MALE* ·
    MAOE · ALOCK* · HHOLD
 + RST* · STG0* · STG1* · STG2* · STG3* ·
    MAOE · ALOCK* · HHOLD · CADS*
 + RST* · STG0* · STG2* · STG3 · MALE ·
    MAOE* · HHOLD · SNPADS*
 + RST* · STG0* · STG1* · STG3 · MALE ·
    MAOE* · HHOLD · SNPADS*
 + RST* · STG0* · STG1* · STG2 · STG3* ·
    MALE* · MAOE
 + RST* · STG0* · STG1 · STG3* · MALE* ·
    MAOE · CRDY
 + RST* · STG0* · STG1 · STG2* · STG3 ·
    MALE* · MAOE
 + RST* · STG0 · STG1* · STG2 · MALE ·
    MAOE* · CDTS
 + RST* · STG0 · STG1* · STG2* · STG3 ·
    MALE* · MAOE
 + RST* · STG0 · STG1* · STG2* · STG3 ·
    MALE · MAOE

The operation of the state machine generated by the STG0, STG1, STG2, and STG3 signals is discussed below. The equations for the signals generated by the PAL's 202 and 204 are as follows:

CNA := RST* · STG0* · STG1* · STG2* ·
STG3* · MALE* · MAOE · HHOLD* ·
CRDY* · ANA
+ RST* · STG0* · STG1* · STG2* ·
STG3* · MALE* · MAOE · HHOLD* ·
CRDY* · MNA
+ RST* · STG0* · STG1* · STG2* ·
STG3* · MALE* · MAOE · ALOCK ·
CRDY* · ANA
+ RST* · STG0* · STG1* · STG2* ·
STG3* · MALE* · MAOE · ALOCK ·
CRDY* · MNA

MADS := RST* · STG0* · STG2* ·
STG3* · MALE* · MAOE · CRDY*
+ RST* · STG0* · STG1* · STG2 ·
STG3* · MALE* · MAOE
+ RST* · STG0* · STG2 · STG3* ·
MALE* · MAOE · CWR
+ RST* · STG0* · STG1 · STG2* ·
STG3* · MALE* · MAOE
+ RST* · STG1 · STG2* · STG3* ·
MALE* · MAOE · CRDY · CDTS*
+ RST* · STG0 · STG1* · STG3* ·
MALE* · MAOE · CDTS*
+ RST* · STG0 · STG1* · STG2* ·
STG3* · MALE · MAOE* · CDTS

MADS1 := RST* · STG0* · STG2* ·
STG3* · MALE* · MAOE · CRDY*
+ RST* · STG0* · STG1* ·STG2 ·
STG3* · MALE* · MAOE
+ RST* · STG0* · STG2 · STG3* ·
MALE* · MAOE · CWR
+ RST* · STG0* · STG1 · STG2* ·
STG3* · MALE* · MAOE
+ RST* · STG1 · STG2* · STG3* ·
MALE* · MAOE · CRDY · CDTS*
+ RST* · STG0 · STG1* · STG3* ·
MALE* · MAOE · CDTS*
+ RST* · STG0 · STG1* · STG2* ·
STG3* · MALE · MAOE* · CDTS

MALE := STG0* · STG1* · STG2* · STG3* ·
MALE* · MAOE · HHOLD* · ANA
+ STG0* · STG1* · STG2* · STG3* ·
MALE* · MAOE · HHOLD* · MNA
+ STG0* · STG1* · STG2* · STG3* ·
MALE* · MAOE · CRDY
+ STG0* · STG1* · STG2* · STG3* ·
MALE* · MAOE · ALOCK · ANA
+ STG0* · STG1* · STG2* · STG3* ·
MALE* · MAOE · ALOCK · MNA
+ STG0* · STG2* · STG3* · MALE ·
MAOE · *CADS
+ STG0* · STG2* · STG3 · MALE · MAOE*
+ STG0* · STG1* · STGE3 · MALE · MAOE*
+ STG0 · STG1* · STG2* · MALE · MAOE*
+ STG0 · STG1* · STG2* · STG3 ·
MALE* · MAOE · CRDY
+ STG0 · STG1* · STG2 · STG3* ·
MALE · MAOE
+ RST

MAOE := STG1* · STG2* · MALE* · MAOE ·
CRDY*
+ STG0* · STG2* · STG3* · MALE ·
+ STG0* · STG2* · STG3* · MAOE ·
ALOCK
+ STG0* · STG2* · STG3* · MALE ·
MAOE · CADS
+ STG0* · STG2* · STG3 · MALE* ·
MAOE
+ STG0* · STG2* · STG3 · MALE ·
MAOE* · HHOLD* · SNPADS*
+ STG0* · STG1* · STG3 · MALE · MAOE* ·
HHOLD* · SNPADS*
+ STG1* · STG2 · STG3* · MAOE

+ STG1 · STG2* · *STGE · MAOE
+ STG0* · STG1 · MALE* · MAOE
+ STG0 · STG3* · MALE* · MAOE
+ RST

MDOE := RST* · STG0* · STG1* ·
STG2 · STG3* · MALE* · CWR
+ RST* · STG0* · STG1 · STG3 ·
MALE* · CWR
+ RST* · STG0 · STG1* · STG2* · STG3* ·
MALE* · CDTS* · CWR
+ RST* · STG0 · STG2* · STG3* ·
MALE* · CRDY · CDTS* · CWR
+ RST* · STG0 · STG1* · STG2* ·
STG3* · MALE · CDTS
+ RST* · STG0 · STG1* · STG2* ·
STG3 · MALE · CRDY*
+ RST* · MDOE · CRDY*
+ RST* · MDOE · CRDY · CRW · MALE* ·
STG3* · STG2* · STG1 · STG0*
+ RST* · MDOE · CRDY · CRW · MALE* ·
STG3* · STG2 · STG1 · STG0*

HADS := RST* · STG0* · STG2* · STG3* ·
MALE · CDTS · CADS
+ RST* · STG0* · STG1* · STG2 ·
STG3* · MALE
+ RST* · STG0* · STG1 · STG3* ·
MALE* · CRDY*
+ RST* · STG0 · STG1* · STG3* ·
MALE* · CDTS
+ RST* · STG0 · STG1 · STG2* ·
STG3* · CDTS
+ RST* · HADS · PHASE

CPUMISS := RST* · STG0* · STG1* · STG2 ·
STG3 · MALE
+ RST* · STG0* · STG1 · STG2* ·
STG3 · MALE
+ RST* · CPUMISS · STG1* · STG2* ·
STG3 · MALE
+ RST* · CPUMISS · STG0 · STG1* ·
STG2* · MALE

Figure 8:
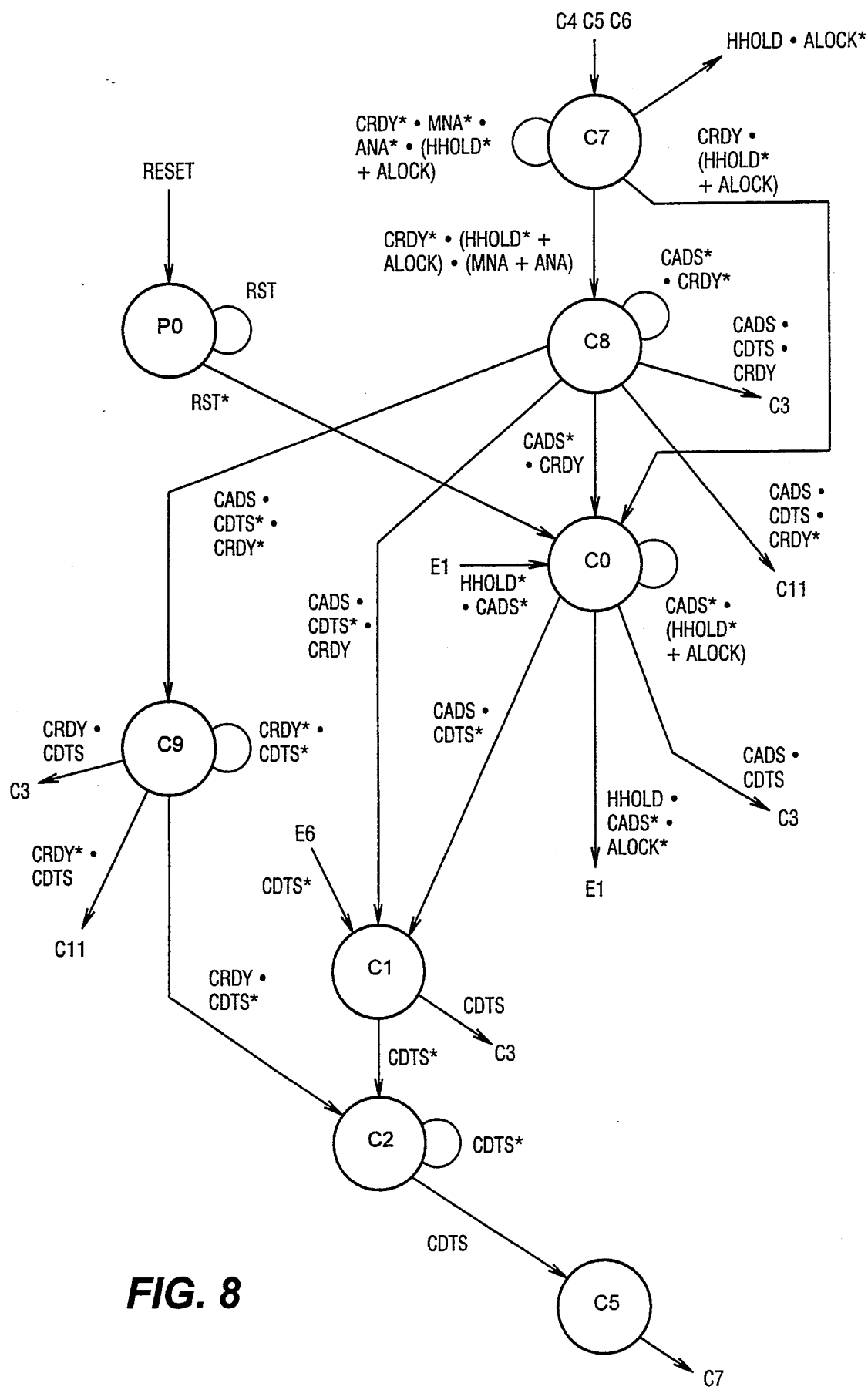
FIGS. 8 and 9 are a state transition diagram illustrating operation of the arbiter logic of FIG. 7.
Figure 9:
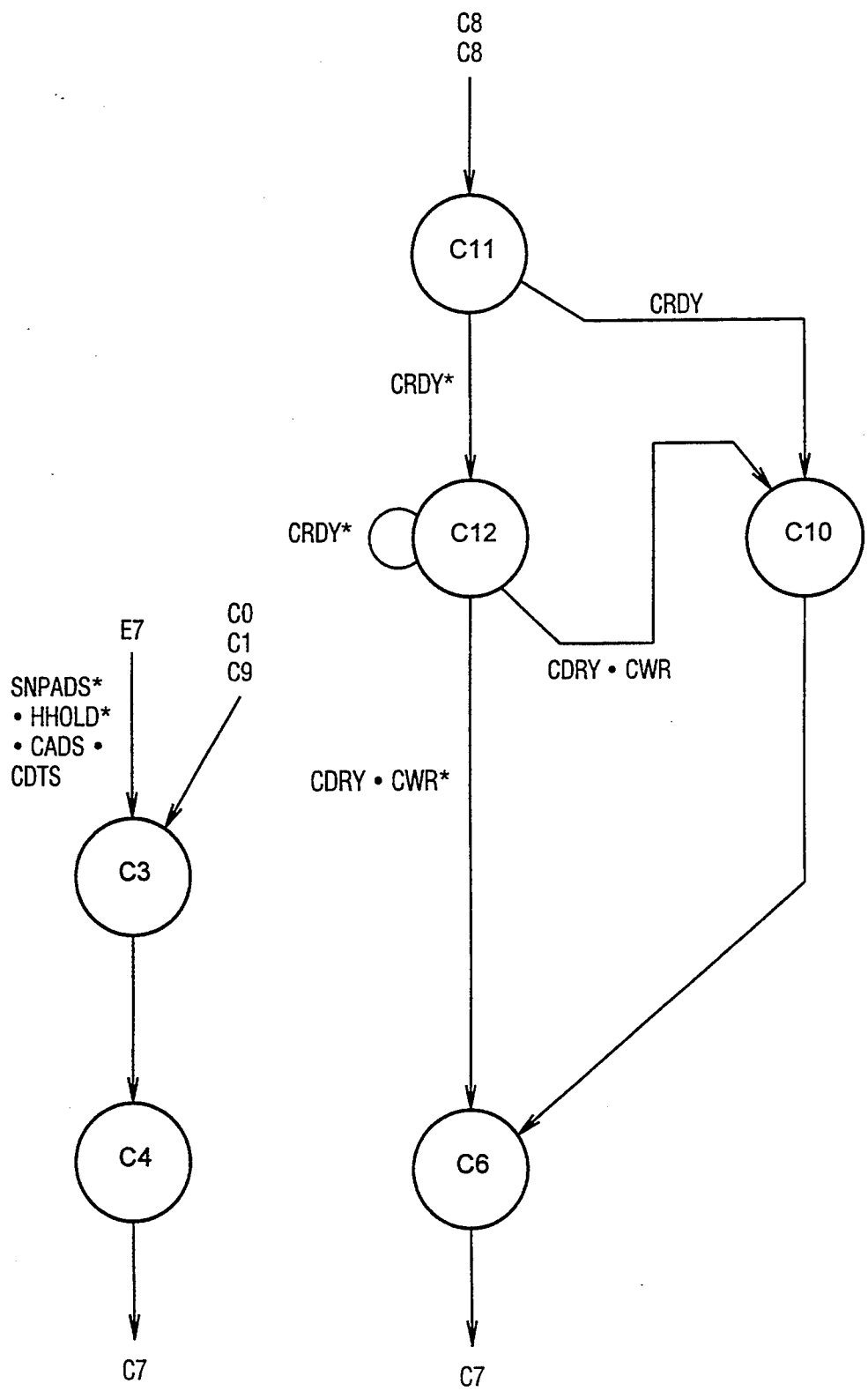

Referring now to FIGS. 8 and 9, a state transition diagram illustrating the operation of the state machine generated by the PAL 202 and used by the PAL 204 to generate the HADS* signal, is shown. On a reset of the computer system, the state machine enters state P0. In state P0, the MALE signal and the MAOE, signal are asserted and the CNA* signal is negated. The state machine remains in state P0 while the RST signal remains asserted. When the RST signal is negated, the state machine advances to state C0. The state machine remains in state C0 while the condition:

CADS* (HHOLD*+ALOCK)

is true. Here the state machine is in an idle state waiting for the address strobe signal CADS* to be asserted. The state machine also arrives in state C0 from a state referred to as E1 (not shown) when the EBC 46 relinquishes control of the host bus H to the arbiter logic 36 and no new cache controller bus cycle is pending, signified by the conditions:

HHOLD* CADS* SNPADS*

If a HHOLD request by the EBC 46 occurs requesting control of the host bus and the current cycle is not a locked cycle, then the state machine will advance to the E1 state where the cache controller 32 will relinquish control of the bus to the EBC 46. This transition is signified by the equation:

HHOLD CADS* ALOCK*.

The state machine advances from state C0 to state C1 when the condition:

CADS CDTS* is true. Therefore, the state machine advances from state C0 to state C1 when the cache controller 32 provides the CADS, signal without the CDTS, signal.

The state machine also advances from a state referred to as E6 to state C1 when the EBC 46 relinquishes control of the host bus H to the arbiter logic 36, the CADS* signal is asserted, and the CDTS* signal is negated. The state machine advances from state C0 to state C3 in the more usual case when the CADS* and CDTS* signals are provided together by the C5 cache controller 32 to initiate a cycle. These two C0 transfer cases are distinguished because the EBC 46 only operates in a pipeline mode where it expects the data path to be available upon receiving a ready signal indicating completion of the previous cycle. If the CDTS* signal is asserted with the CADS* signal, then the HADS* signal can be asserted in the following state. If the CDTS* signal is not provided with the CADS* signal, then the state machine delays asserting the HADS* signal until the CDTS* signal is asserted. Therefore, the HADS* signal is provided to the EBC 46 only after the CDTS* signal is asserted. In state C1, the MALE signal is deasserted to enable the arbiter logic 36 to latch in the address into its internal latches and provide the address to the host bus. The state machine advances from state C1 to state C2 on the next CLK2 signal cycle if the CDTS* signal remains negated. In state C2, the MDOE signal and the MADS* signal are asserted low, and the HADS* signal remains negated high. It is noted that the MADS* signal could be asserted one CLK2 signal cycle earlier in state C1. However, in the preferred embodiment, the memory controller 40 is designed such that when it sees the MADS* signal asserted, it knows that the CADS* signal was asserted 2 CLK2 signal cycles (40 ns) earlier and thus expects the data signals to be valid at the pins of the DRAM's in the memory 42.

Figure 10:
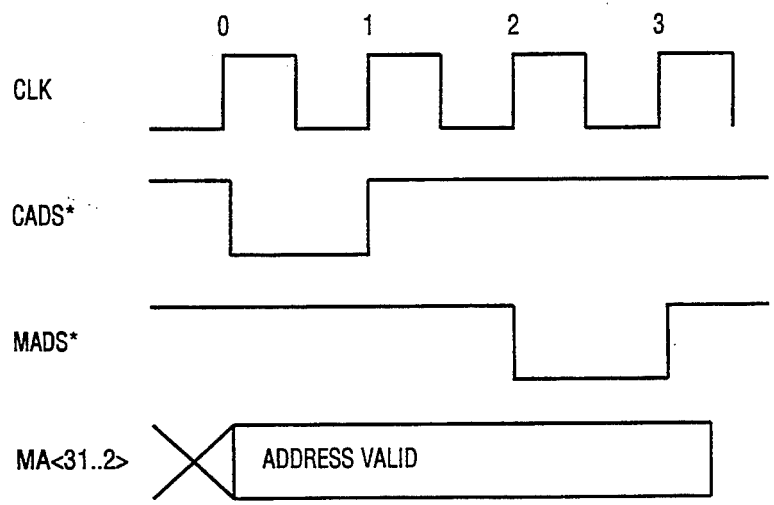
FIG. 10 is a timing diagram illustrating operation of the arbiter logic of FIG. 5.

Referring now to FIG. 10, the CADS* signal is asserted at point 0 in state C0. The MADS* could be asserted in state C1 at point 1, and an unintelligent memory controller would view the assertion of the MADS* signal as the address becoming valid at the pins of the C5 cache controller 32. However, the address actually became valid one CLK2 signal cycle earlier at point 0. Therefore, if the MADS* signal were asserted in state C1 at point 1, an unintelligent memory controller would lose one CLK2 signal cycle. In the preferred embodiment, the MADS* signal is asserted in state C2 at point 2 as shown, and the memory controller 40 is designed with intelligence such that, when it sees the MADS* signal valid at the pins of the C5 cache controller 32 two CLK2 signal cycles (40 ns) ago. Thus, when the memory controller 40 sees the MADS* signal asserted, it knows that the address has had sufficient time to propagate through the host bus H, the DDF logic 38 and the memory controller 40 and thus is valid at the pins of the DRAM's in the memory 42.

The state machine remains in state C2 while the CDTS* signal remains negated. In this state, the state machine is waiting for the data bus to become available and the cache controller 32 to output valid data on the data bus and assert the CDTS signal. In state C2, the memory controller begins a new memory cycle. However, the EBC 46 does not start a new cycle but rather is waiting for the HADS* signal to be asserted. Therefore, in this state, the MADS* signal is asserted low, while the HADS* signal remains negated high.

The state machine transitions from state C2 to state C5 when the CDTS* signal is asserted. In state C5, the arbiter logic 36 asserts the HADS* signal to the EBC 46 and thus the EBC 46 begins a new cycle. The MADS* signal is negated high in this state, and the BGT* and WEND* signals remain asserted low. In state C5, the state machine transitions to state C7 on the next CLK2 signal cycle and the HADS* signal is negated.

When the state machine is in state C1 and if the CDTS* signal is asserted in this state, then the state machine transitions to state C3 and the HADS* signal is asserted in this state. In this instance, the asserted CDTS* signal allows the arbiter logic 36 to immediately assert the HADS* signal, instead of having to progress through states C2 and C5. Also, as previously mentioned, when the state machine is in state C0 and the CADS* and CDTS* signals are asserted together in this state, the state machine advances to state C3. The state machine also progresses to state C3 from a state referred to as E7 when the EBC 46 relinquishes control of the bus to the arbiter logic 36, and the CADS* and CDTS* signals, having been previously asserted in a prior state, remain asserted in this state. In this state, the asserted HADS* signal initiates an EBC cycle. The state machine transitions from state C3 to state C4 on the next CLK2 signal cycle. In state C4, the HADS* signal is negated high and the MADS* signal is asserted low, thereby starting a memory cycle in the memory controller 40 for the non-pipelined bus cycle initiated by the cache controller 32. When the state machine transitions from states C0 to C3 to C4, the MADS* signal is asserted in state C4 two CLK2 signal cycles (40 ns) after the CADS* signal was asserted in state C0. Thus the memory controller 40 is aware that the address is valid at the DRAMs as was described above. It is noted that when the state machine transitions from state C0 through states C1 and C3 to state C4, then the MADS, signal is asserted 3 CLK2 signal cycles (60 ns) after the CADS* signal is asserted, and thus a clock cycle is lost in this instance. However, this transition sequence occurs relatively infrequently, and thus very few cycles are lost. Also, this penalty is incurred to assert the HADS* signal in state C3 immediately following assertion of the CDTS* signal in state C1. It is noted that, although the MADS* and HADS* signals are asserted, only one of either the memory controller 40 or the EBC ultimately responds and performs a cycle, depending on which was accessed.

The state machine progresses from state C4 to state C7 on the next CLK2 signal cycle.

In state C7, the state machine is waiting for either the current cycle to complete or for the next address to be requested from the C5 cache controller 32 by either the memory controller 32 or the ADS logic 50. In this state, the MADS* signal is negated high and the MAOE* signal is negated high.

The state machine remains in state C7 while the condition:

CRDY* MNA* ANA* (HHOLD*+ALOCK)

is true. The state machine advances from state C7 to state C8 when the condition:

CRDY* (HHOLD*+ALOCK) (MNA+ANA)

is true. The state machine advances from state C7 to state C0 when the condition:

CRDY (HHOLD*+ALOCK)

is true. This is when the current cycle completes and no pipelining is being executed. The state machine advances to either of state E0 or E1 (both not shown) to grant control of the host bus H to the EBC 46 if the EBC 46 requests control of the host bus H and the current cycle is not a locked cycle. The state machine advances from state C7 to state C8 if either of the two next address signals is asserted. As previously discussed, the ANA* signal is generated by the ADS logic 50 and indicates that the EBC 46 has responded with the next address signal HNA* to complete a burst transfer. The MNA* signal is generated by the memory controller and indicates that the memory controller is finished with the current address. The asserted ANA* or MNA* signal indicates that the EBC 46 or memory controller 40, respectively, is finished with the current address and can begin pipelining. If either of the next address signals is asserted before the CRDY signal is asserted, the state machine advances from state C7 to state C8, and the CNA* signal is asserted by the arbiter logic 36 to the cache controller 32, indicating that the arbiter logic 36 can now accept a new CADS* strobe. In state C8, the MALE signal is reasserted by the arbiter logic 36 to allow the cache controller address outputs to flow through and pass on the next address information. Thus in state C8 the cache controller 32 is free to initiate a new cycle by asserting a new CADS* strobe. The state machine stays in state C8 while an address has not been provided and the previous cycle not completed. In state C8, the state machine may branch either left or right depending on whether or not the CDTS* signal is provided with the CADS* signal on the upcoming cycle generated by the cache controller 32. As previously discussed with regard to states C0, C1 and C3, this distinction is made because the HADS* signal can only be asserted after the data path is available and the CDTS* signal is asserted.

The state machine advances from state C8 to state C3 when the condition:

CADS CDTS CRDY is true. The state machine advances from state C8 to state C3 when the CADS* and CDTS* signal are presented at the beginning of a new cycle and the previous cycle has completed, signified by the CRDY* signal being asserted. In state C3, the cache controller 32 begins a new non-pipelined cycle. If the CADS* and CDTS* signals are asserted together before the previous cycle completes, i.e. before the CRDY* signal is asserted, then the processor 30 is beginning pipelining, and the state machine advances from state C8 to state C11.

The state machine advances from state C8 to state C11 when the condition:

CADS CDTS CRDY* is true. In state C11 the MALE signal is deasserted to latch the address from the cache controller 32 into the internal address latches. Also, in state C11 the HADS* signal is asserted low because the CDTS* signal was asserted in the previous state.

The state machine advances from state C11 to state C12 on the subsequent CLK2 signal cycle if the CRDY* signal remains negated. The state machine remains in state C12 while the CRDY* signal remains negated. In state C12, the MADS* signal is asserted low and the HADS* signal remains asserted. The state machine advances from state C11 to state C10 if the CRDY* signal is asserted before the next CLK2 signal cycle. The state machine advances from state C12 to state C10 when the condition:

CRDY CWR is true. Therefore, the state machine advances from state C12 to state C10 when the previous cycle completes and the new cycle is a write cycle. In state C10, the MADS, signal is asserted low and the HADS, signal is negated high. In state C10, the MDOE* signal remains asserted if it has previously been asserted in state C11. The state machine advances from state C10 to state C6 on the next CLK2 signal cycle and the MDOE* signal is asserted in this state if the current cycle is a write cycle to enable write data onto the host data bus. In state C6 either a pipelining EBC cycle or memory cycle begins.

The state machine advances from state C12 to state C6 when the previous cycle completes and the new cycle is a read cycle. In state C6, the MADS* signal is asserted low and the HADS* signal is negated high. The MDOE* signal remains asserted if it had been previously asserted upon entering state C6.

The state machine advances from state C8 to state C1 when the condition:

CADS CDTS* CRDY is true. Under this condition the address is pipelined and the previous cycle is completed and the state machine is waiting on data from the cache controller 32. The state machine advances from state C8 to state C9 when the previous cycle has not completed, the CADS* signal has been asserted initiating a new cycle and the CDTS* signal has not been asserted, signified by the conditions:

CADS CDTS* CRDY*

In this instance, a new cycle has been initiated before the previous cycle has completed, and thus this transition is similar to the transition from state C8 to state C11, the only difference being that the CDTS* signal was not asserted with the CADS* signal by the cache controller 32 at the beginning of the cycle. In one embodiment of the invention, states C11, C12, C10 and C6 are duplicated on the left side of the state machine in place of state C9, and thus the arbiter logic 36 begins pipelining when the condition:

CADS CDTS* CRDY* is true in state C8. However, in the preferred embodiment, these additional states are not included in order to reduce the required logic, and the state machine advances to state C9 when the above condition is true. In state C9, the MALE signal is deasserted to latch the address in the internal address latches in the arbiter logic 36. The state machine remains in state C9 while the condition:

CRDY* CDTS* is true. The state machine remains in state C9 until the previous cycle is completed or until the CDTS* signal is asserted, indicating that the data path is available for new data. The state machine advances from state C9 to state C2 when the condition:

CRDY CDTS* is true. The state machine advances from state C9 to state C2 to begin a new non-pipelined cycle when the previous cycle completes and the CDTS* strobe has not been asserted. The state machine advances from state C9 to state C3 when the condition:

CRDY CDTS is true, i.e. when the previous cycle has completed and the data path is available. Therefore, when the current cycle completes, the state machine transition from C9 to either state C2 or C3 depending on whether the CDTS* signal is asserted. It is noted that this transition sequence is similar to the transition from state C0 to either of states C1 or C3, which was also based on the status of the CDTS* signal.

The state machine advances from state C9 to state C11 when the condition:

CRDY* CDTS is true. The state machine advances to state C11 to begin pipelining when the data path becomes available and the previous cycle has not yet completed.

Therefore, the arbiter logic 36 can initiate pipelining when the CDTS* signal is not asserted with the CADS* signal and the state machine advances left from state C8. However, as a penalty for not including the extra logic to duplicate states C11, C12, C10 and C6, an additional state, state C9, is necessary before pipelining can be initiated.

Therefore, the present invention includes an apparatus which converts burst mode cycles generated by the C5 cache controller 32 into single cycle mode cycles that are recognizable by the EBC 46. In addition, present invention includes an apparatus which receives separate address and data strobes from the cache controller 32 and provides a single strobe signal to the EBC 46.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An apparatus for converting burst mode transfers into single cycle mode transfers in a computer system, the apparatus comprising:

a system bus;

a first device connected to said system bus and executing burst transfers on said system bus, wherein the first device generates a first address strobe signal and a plurality of address signals at the beginning of said burst transfer and no address strobe signals thereafter during the burst transfer, wherein a first number of said plurality of address signals are provided to said system bus, and wherein the first device generates signals indicative of said burst transfer size at the beginning of said burst transfer;

a second device having a first number and a second number of address signal inputs and being connected to said system bus and only capable of receiving single cycle mode transfers with an address strobe for each transfer, wherein said first number of said plurality of address signal inputs are connected to said first number of said address signals on said system bus provided by said first device and said second number of said address signal inputs are connected to said system bus and wherein said first number is greater than said second number;

means coupled to said system bus and to said first device for receiving a second number of address signals from said first device and for receiving said first address strobe signal from said first device and storing said second number of address signals;

means coupled to said second number of address signal storing means for incrementing said second number of address signals, wherein said incrementing means increments said second number of address signals for each cycle comprising said burst transfer after the first transfer;

means coupled to said second device for providing an additional address strobe signal to said second device for each cycle comprising said burst transfer except the first transfer;

means coupled to the system bus, said additional address strobe means and said address signal incrementing means for providing said incremented second number of address signals to the system bus approximately contemporaneously with providing said additional address strobe signal, wherein said second number of address signals are provided to said system bus to correspond to said second number of address signal inputs of said second device; and means coupled to the first device and said additional address strobe means for terminating providing of additional address strobes when the number of additional address strobes provided indicates that, based on size of the burst transfer as indicated by the first device, the last additional address strobe has been provided.

2. The apparatus of claim 1, wherein said second device provides a complete signal for each cycle comprising said burst transfer to said system bus indicating that a subsequent cycle may begin, and wherein said additional address strobe signal providing means receives said complete signal and provides said additional address strobe signal after receiving said complete signal.

3. The apparatus of claim 2, wherein said complete signal is a next address request signal.

4. The apparatus of claim 1, wherein said first device includes means for providing further address strobe signals upon receipt of a cycle complete signal and wherein said terminating means includes means for providing the cycle complete signal to the first device after terminating providing of additional address strobes.

* * * * *

UNITED STATES PATENT AND TRADEMARK OFFICE
CERTIFICATE OF CORRECTION

PATENT NO. : 5,440,751
DATED : August 8, 1995
INVENTOR(S) : Paul Santeler et al.

It is certified that error appears in the above-identified patent and that said Letters Patent is hereby corrected as shown below:

In col. 20, line 38, please delete "approximately".

Signed and Sealed this

Tenth Day of October, 1995

Attest:

BRUCE LEHMAN

Attesting Officer

Commissioner of Patents and Trademarks